(12) United States Patent  (10) Patent No.: US 8,553,011 B2
Chang  (45) Date of Patent: Oct. 8, 2013

(54) METHOD AND DEVICE FOR CAPACITIVE SENSING

(75) Inventor: Chin-Fu Chang, Taipei County (TW)

(73) Assignee: Egalax_Empia Technology Inc., Taipei (TW)

(*) Notice: Subject to any disclaimer, the term of this patent is extended or adjusted under 35 U.S.C. 154(b) by 998 days.

(21) Appl. No.: 12/499,981

(22) Filed: Jul. 9, 2009

(65) Prior Publication Data
US 2010/0007630 A1 Jan. 14, 2010

Related U.S. Application Data

(60) Provisional application No. 61/103,626, filed on Oct. 8, 2008.

(30) Foreign Application Priority Data

Jul. 9, 2008 (TW) ............................... 97125842 A

(51) Int. Cl.
G06F 3/045 (2006.01)

(52) U.S. Cl.
USPC ........................................ 345/174; 178/18.06

(58) Field of Classification Search
USPC ..................... 345/173–174; 178/18.01, 18.06
See application file for complete search history.

(56) References Cited

U.S. PATENT DOCUMENTS

| 2007/0046643 | A1* | 3/2007 | Hillis et al. | 345/173 |
| 2007/0229464 | A1* | 10/2007 | Hotelling et al. | 345/173 |
| 2007/0296709 | A1* | 12/2007 | GuangHai | 345/173 |
| 2008/0150906 | A1* | 6/2008 | Grivna | 345/173 |

FOREIGN PATENT DOCUMENTS

CN 101101525 1/2008

* cited by examiner

Primary Examiner — Hong Zhou
(74) Attorney, Agent, or Firm — WPAT, PC; Justin King

(57) ABSTRACT

The disclosed capacitive sensing device has first conductive lines, second conductive lines and electrical conductors. The first conductive lines are electrically isolated from each other, the second conductive lines are electrically isolated from each other and electrically isolated from and stacked with the first conductive lines to form numerous intersecting points, and the electrical conductors are electrically isolated from each other and correspondingly crossing the first and the second conductive lines and being around the intersecting points. Herein, the electrical conductors are electrically isolated from the first and second conductive lines. When an electrical signal is driven to a first conductive line, the first conductive line is capacitive coupled to the second conductive lines which intersecting mutually, and the electrical conductors crossing the first conductive line are respectively capacitive coupled to the first conductive line and the mutually intersecting second conductive lines to provide a higher compound capacitance.

25 Claims, 14 Drawing Sheets (a)

(b)

(c)

(d)

METHOD AND DEVICE FOR CAPACITIVE SENSING

BACKGROUND OF THE INVENTION

1. Field of the Invention

The present invention relates to a touch device and method, and more particularly, to a capacitive sensing device and method.

2. Description of the Prior Art

Referring to FIG. 1, a diagram depicting a prior-art capacitive sensing device with multi-touch operations and a capacitance image is shown. A touch panel 110 has a plurality of first conductive lines 112 and a plurality of second conductive lines 114. The first and second conductive lines are perpendicularly stacked on and electrically isolated from each other. When a sensing signal (not shown) is input to one of the first conductive lines 112, it creates a plurality of capacitive coupling with all of the second conductive lines at intersecting points, thereby determining the electrical characteristics of the intersecting points based on the current or voltage on all of the second conductive lines. Each of the first conductive lines 112 are sequentially provided with the sensing signal, and the electrical characteristics of all the intersecting points can be determined by the sensing process just described.

When a human, naturally grounded, touches or gets near a sensing location (an intersecting point) with his/her finger tip, the coupling capacitance of the sensing location is influenced, that is, current or voltage thereof is changed. However, when there are two touch points P1 and P2 on the touch panel 110, not only the current or voltage at touch points P1 and P2 would change, but also the current or voltage at two other intersecting points G1 and G2 (forming the so-called "Ghost points"). Thus, two touch points P1 and P2 will result in the current or voltage change in four intersecting points on the touch panel 110 (e.g. (X1, Y4), (X3, Y6), (X1, Y6) and (X3, Y4)) and the actual touch points cannot be identified. Explain further from the capacitance image 120, the capacitance image wave P1W1 of a touch point P1(X1, Y4) is different from the capacitance image waves G1W1 and G2W1 of intersecting points G1(X1, Y6) and G2(X3, Y4) by d1 and d3, respectively; the capacitance image wave P2W2 of a touch point P2(X3, Y6) is different from the capacitance image waves G1W1 and G2W1 of the intersecting points G1(X1, Y6) and G2(X3, Y4) by d4 and d2, respectively. However, the magnitudes of d1~d4 are too small to make use, and sensing can be easily affected by noises, thus multi-touch operations are often mistakenly determined.

In view of these problems, the present invention provides a capacitive sensing method and device, which improves the problem with multi-touch operations and effectively makes use of a current or voltage difference generated as a result of touching.

SUMMARY OF THE INVENTION

Therefore, in accordance with the previous summary, objects, features and advantages of the present disclosure will become apparent to one skilled in the art from the subsequent description and the appended claims taken in conjunction with the accompanying drawings.

The present invention discloses a capacitive sensing device. The device includes a plurality of first conductive lines electrically isolated from each other; a plurality of second conductive lines electrically isolated from each other and electrically isolated from and stacked with the first conductive lines to form a plurality of intersecting points; and a plurality of electrical conductors electrically isolated from each other and correspondingly crossing the first and the second conductive lines and being around the intersecting points, wherein the first and second conductive lines and the electrical conductors are electrically isolated from each other. By doing so, when an electrical signal is driven to any first conductive line, the first conductive line is capacitively coupled to the second conductive lines with which it intersects, and the electrical conductors crossing the first conductive line are respectively capacitively coupled to the first conductive line and the second conductive lines which intersect with the first conductive line to provide a higher compound capacitance.

The present invention also discloses a capacitive sensing device, comprising: a signal unit for providing an electrical signal to a first conductive line; a first sensing unit for respectively receiving a plurality of first sensing signals from a plurality of second conductive lines before at least one of a plurality of electrical conductors capacitively or contact coupled with an object, wherein the second conductive lines are electrically isolated from each other; a second sensing unit for respectively receiving a plurality of second sensing signals from the second conductive lines when at least one of the electrical conductors capacitively or contact coupled with the object; and a calculation unit for calculating at least one touched location based on the first and second sensing signals, wherein the electrical conductors respectively position around and cross intersecting points of the first conductive line and the second conductive lines, the first and second sensing signals respectively include compound values of capacitive coupling between the first conductive line, the second conductive lines and the electrical conductors before and after coupling.

The present invention also discloses a capacitive sensing method, comprising the steps of: providing an electrical signal to a first conductive line; receiving a plurality of first sensing signals from a plurality of second conductive lines before at least one of a plurality of electrical conductors capacitively or contact coupled with an object, wherein the second conductive lines are electrically isolated from each other; receiving a plurality of second sensing signals from the second conductive lines when at least one of the electrical conductors capacitively or contact coupled with the object; and calculating at least one touched location based on the first and second sensing signals, wherein the electrical conductors respectively position around and cross intersecting points of the first conductive line and the second conductive lines, the first and second sensing signals respectively include compound values of capacitive coupling between the first conductive line, the second conductive lines and the electrical conductors before and after coupling.

The present invention also discloses a capacitive sensing device, comprising: a first sensing unit for respectively receiving a plurality of first sensing signals from a plurality of first and second conductive lines before at least one of a plurality of electrical conductors capacitively or contact coupled with an object, wherein the first and second conductive lines are electrically isolated from each other; a second sensing unit for respectively receiving a plurality of second sensing signals from the first and second conductive lines when at least one of the electrical conductors capacitively or contact coupled with the object; and a calculation unit for calculating at least one touched location based on the first and second sensing signals, wherein the electrical conductors respectively position above the first conductive line and the second conductive lines and a first dielectric layer is electrically isolated with the first and second conductive lines, the first and second conductive lines are electrically isolated from each other by a second dielectric layer, the first and second sensing signals respectively include compound values of capacitive coupling between the first conductive lines, the second conductive lines and the electrical conductors before and after coupling.

The present invention also discloses a capacitive sensing method, comprising the steps of: respectively receiving a plurality of first sensing signals from a plurality of first and second conductive lines before at least one of a plurality of electrical conductors capacitively or contact coupled with an object, wherein the first and second conductive lines are electrically isolated from each other; respectively receiving a plurality of second sensing signals from the first and second conductive lines when at least one of the electrical conductors capacitively or contact coupled with the object; and calculating at least one touched location based on the first and second sensing signals, wherein the electrical conductors respectively position above the first conductive line and the second conductive lines and a first dielectric layer is electrically isolated with the first and second conductive lines, the first and second conductive lines are electrically isolated from each other by a second dielectric layer, the first and second sensing signals respectively include compound values of capacitive coupling between the first conductive lines, the second conductive lines and the electrical conductors before and after coupling.

The present invention also discloses a capacitive sensing device, comprising: a signal unit for providing an electrical signal; a sensing unit for capacitively coupling with the signal unit through a first conductive line, a second conductive line and at least one of a plurality of electrical conductors, the first and second conductive line being capacitively coupled, the electrical conductors respectively cross the first and second conductive lines and capacitively coupled with the first and second conductive lines, wherein the first conductive line is driven by the electrical signal.

The present invention also discloses a capacitive sensing device, comprising: a plurality of first conductive lines electrically isolated from each other; a plurality of second conductive lines electrically isolated from each other, wherein the first and second conductive lines are electrically isolated from and stacked on one another forming a plurality of intersecting points; a plurality of electrical conductors electrically isolated from each other, the electrical conductors respectively crossing the first and second conductive lines and positioning around the intersecting points, wherein the first and second conductive lines and the electrically conductors are electrically isolated from one another; a signal unit for providing an electrical signal; and a sensing unit for capacitively coupling with the signal unit through one of the first conductive lines, one of the second conductive lines and at least one of the electrical conductors, the at least one electrical conductor and the ones of first and second conductive lines being capacitively coupled, respectively, and wherein the one of the first conductive lines is driven by the electrical signal.

The present invention also discloses a capacitive sensing device, comprising: a plurality of first conductive lines electrically isolated from each other; a plurality of second conductive lines electrically isolated from each other, wherein the first and second conductive lines are electrically isolated from and stacked on one another forming a plurality of intersecting points; and a plurality of electrical conductors electrically isolated from each other, the electrical conductors respectively crossing the first and second conductive lines and positioning around the intersecting points, wherein the first and second conductive lines and the electrical conductors are electrically isolated from one another, thereby when a plurality of objects capacitively or contact coupled with at least one of the first and second conductive lines and the electrical conductors, a sensing unit sensing a compound value of the capacitive couplings between the objects and the coupled first and second conductive lines and electrical conductors, providing a higher difference for identifying and eliminating ghost coordinates that are coupled with the objects.

The present invention also discloses a capacitive sensing device, comprising: a plurality of first conductive lines; a plurality of second conductive lines forming a plurality of intersecting points with the first conductive lines; a plurality of electrical conductors crossing the intersecting points; and a sensing unit for sensing compound signals of the intersecting points which are affected by capacitive couplings of the electrical conductors.

The present invention also discloses a capacitive sensing device, comprising: a signal unit for driving a touch panel comprising a plurality of first and second conductive lines that form a plurality of intersecting points, wherein a plurality of electrical conductors cross the intersecting points; a sensing unit for sensing compound signals of the intersecting points that are affected by capacitive couplings of the electrical conductors; and a calculation unit for calculating at least one touched location based on the amounts of changes in the compound signals.

The present invention also discloses a capacitive sensing method, comprising: driving a touch panel comprising a plurality of first and second conductive lines that form a plurality of intersecting points, wherein a plurality of electrical conductors cross the intersecting points; sensing compound signals of the intersecting points that are affected by capacitive couplings of the electrical conductors; and calculating at least one touched location based on the amounts of changes in the compound signals.

The present invention also discloses a capacitive sensing device comprising a plurality of first and second conductive lines forming a plurality of intersecting points and detecting at least one touched location based on mutual-capacitance of the intersecting points, wherein any two touched locations constitute a pair of diagonal real vertices on a virtual bounding parallelogram, the other pair of diagonal on the virtual bounding parallelogram being a pair of pseudo vertices, characterized in that the capacitive sensing device further comprising: a plurality of electrical conductors crossing the intersecting points, the dimension of the electrical conductors determining signal differences between the intersecting points around the real vertices and those around the pseudo vertices.

The present invention also discloses a capacitive sensing device comprising a sensing unit detecting changes in charge coupling between a plurality of first conductive lines, a plurality of second conductive lines and a plurality of electrical conductors around or overlaying the intersections of the first conductive lines and the second conductive lines; a signal unit operatively driving an electrical signal to capacitively couple with the sensing unit through one of the first conductive lines, one of the second conductive lines and one of the electrical conductors; and a position identifying unit identifying a position of each object touching or being near the capacitive sensing device by the changes in charge coupling between the first conductive lines, the second conductive lines and the electrical conductors.

The present invention also discloses a capacitive sensing method, comprising: sensing signals or signal changes of a plurality of intersecting points on a touch panel through mutual capacitance of the touch panel, wherein the touch panel includes intersecting points formed from a plurality of perpendicular conductive lines and a plurality of electrical conductors respectively crossing or surrounding the intersecting points, wherein a predetermined range is determined based on the electrical conductors; identifying the location of an object touching or getting near the touch panel based on the signals or signal changes of the intersecting points that fall within the predetermined range; and continuously identifying the locations of the object to determine whether it is a command gesture.

Alternatively, the above method may also comprise sensing signals or signal changes of a plurality of intersecting points on a touch panel through mutual capacitance of the touch panel to form an image, wherein the touch panel includes intersecting points formed from a plurality of perpendicular conductive lines and a plurality of electrical conductors respectively crossing or surrounding the intersecting points. A predetermined range is determined based on the electrical conductors, and identifying the location of an object touching or getting near the touch panel based on the signals or signal changes of the intersecting points that fall within the predetermined range in the image, thereby continuously identifying the locations of the object to determine whether it is a command gesture.

The sensing of the signals or signal changes of a plurality of intersecting points on the touch panel or forming of the image can be achieved by a sensing unit. In addition, continuously identifying of the trajectory of the object touch or getting near the touch panel based on locations of the objects or a plurality of images and determining whether the object trajectory is a command gesture can be achieved by an identifying unit. Also, the above mentioned sensing unit, signal unit, calculating unit can be integrated into a controller.

The command gesture is one a plurality of preset gestures selected from the group consisting of movement of an object in one direction; single object rotation, relative movements between a plurality of objects, relative rotations between a plurality of objects, rotation of one object around another and movement of a plurality of objects in the same direction.

A command is executed based on the command gesture identified, wherein the command is one selected from the group consisting of zoom-in, zoom-out, rotate, translate, scroll, cut, paste and delete.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention. In order to illustrate the principles of the present invention, some elements are not drawn to scale, exaggerated or omitted for clarity.

Figure 2:
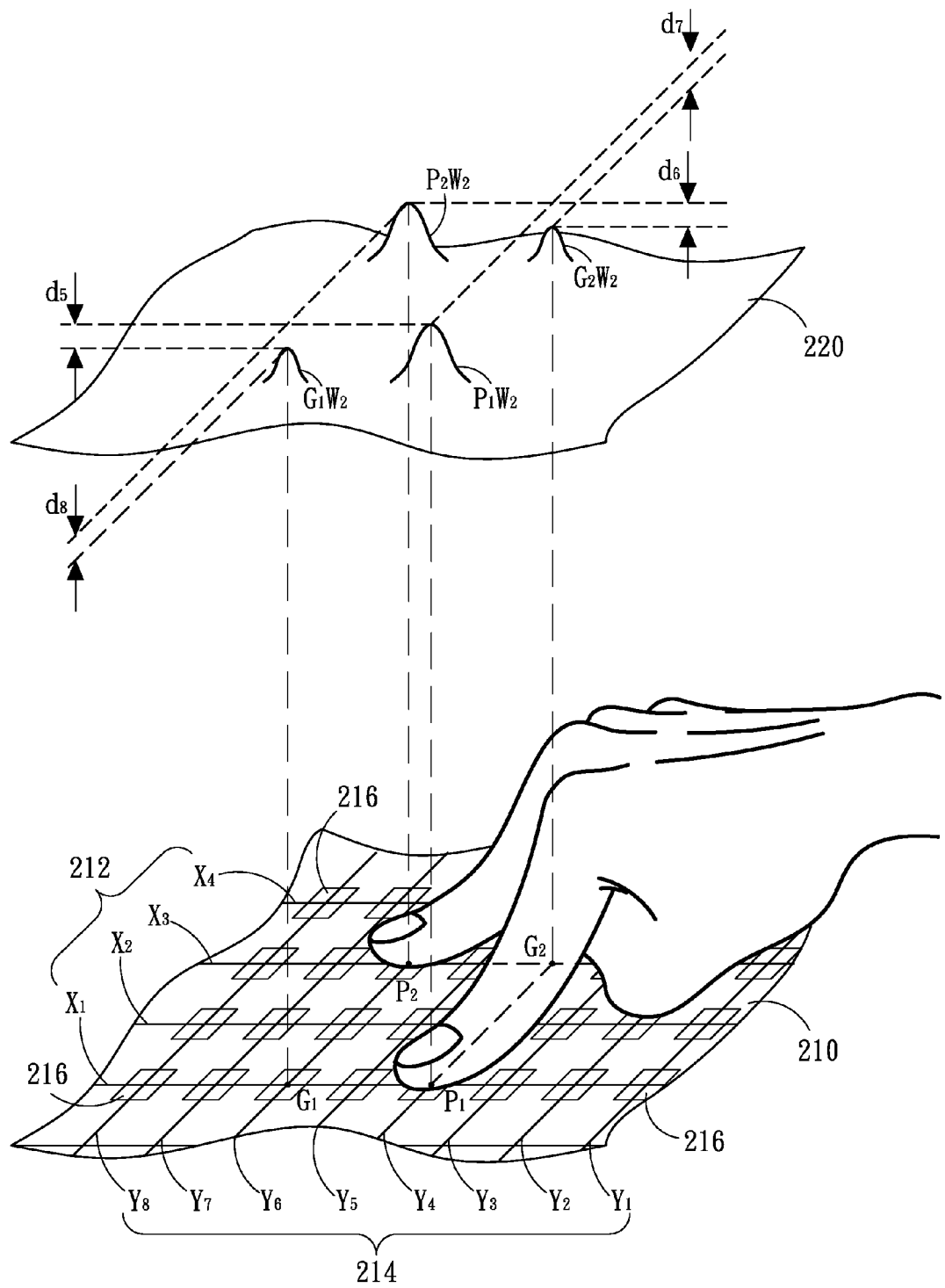
FIG. 2 is a schematic block diagram depicting a panel with multi-touch operations and a capacitance image according to a preferred embodiment of the present invention.

Referring to FIG. 2, a diagram depicting multi-touch operations and a capacitance image according to a preferred embodiment of the present invention is shown. A touch panel 210 has a plurality of first conductive lines 212 and a plurality of second conductive lines 214. The first and second conductive lines 212 and 214 are stacked on and electrically isolated with each other. An electrical conductor 216 crosses each pair of intersecting first conductive lines 212 and second conductive lines 214, and provided around the intersecting points of the first conductive lines 212 and second conductive lines 214.

Figure 1:
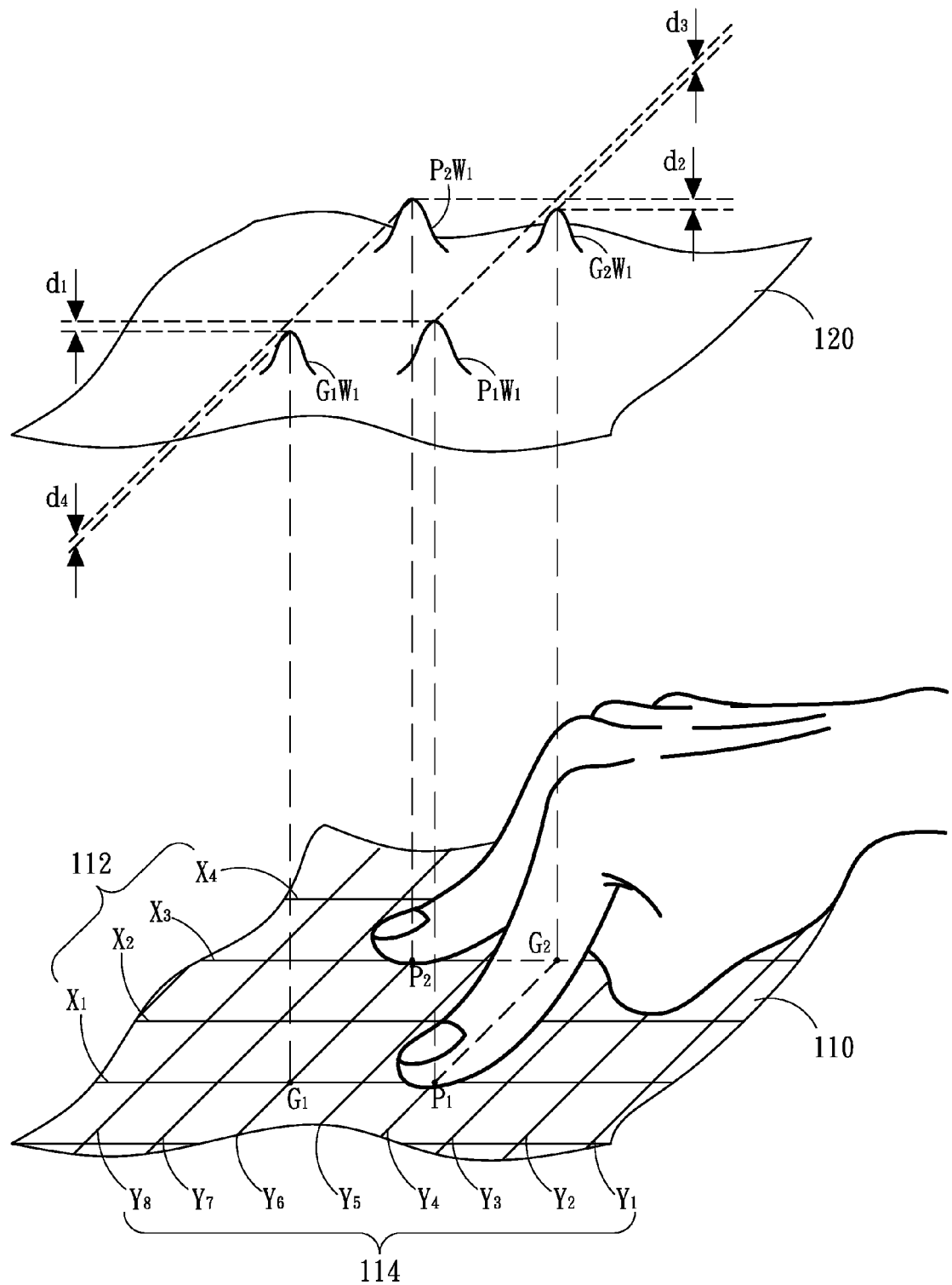
FIG. 1 is a diagram depicting a prior-art touch panel with multi-touch operations and a capacitance image.

When there are two touch points P1 and P2 on the touch panel 210, there will be a current or voltage change at P1 and P2 as well as G1 and G2. Refer to the capacitance image 220 for further illustration, the capacitance image wave P1W2 of a touch point P1(X1, Y4) is different from the capacitance image waves G1W2 and G2W2 of intersecting points G1(X1, Y6) and G2(X3, Y4) by d5 and d7, respectively; the capacitance image wave P2W2 of a touch point P2(X3, Y6) is different from the capacitance image waves G1W2 and G2W2 of the intersecting points G1(X1, Y6) and G2(X3, Y4) by d6 and d8, respectively. However, the magnitudes of d5~d8 are much larger than those of d1~d4 shown in FIG. 1. The current or voltage change is obtained from prior art by sensing a single mutual capacitance change between the first and second conductive lines 212 and 214, while in this embodiment, the current or voltage change is obtained by sensing three-mutual-capacitance compound change between the first and second conductive lines 212 and 214, the first and second conductive lines 212 and 216 and the second conductive line 214 and electrical conductor 216, as a result, the three-mutual-capacitance compound change is significantly larger than the single mutual capacitance change. Thereby, the touch points P1 and P2 can be clearly distinguished from the intersecting (or ghost) points G1 and G2.

It should be noted that the present embodiment is illustrated in the context of two touch points; however, situations of more than two touch points can be easily envisaged by one with ordinary skills in the art. In other words, any two touch points can form a pair of real vertices on a diagonal of a virtual bounding parallelogram (e.g. a rectangular or rhombus), such as P1 and P2. On the contrary, a pair of pseudo vertices is on the other diagonal of the virtual bounding parallelogram, such as G1 and G2. The electrical conductor 216 increases the signal differences between the intersecting points around the real vertices and the intersecting points around the pseudo vertices. In addition, the dimension of the electrical conductor 216 determines the signal differences between the intersecting points around the real vertices and the intersecting points around the pseudo vertices. Assuming that the path of the conductor is constant, the larger the electrical conductor 216, the larger the difference between the intersecting points around the real vertices and the intersecting points around the pseudo vertices, and vice versa. It can be appreciated that the relationship between the dimension of the conductor 216 and the signal difference between the intersecting points around the real vertices and the intersecting points around the pseudo vertices is not necessary linear. Moreover, due to variations in the distances between real or pseudo vertices and the neighboring intersecting points, the number of intersecting points generating a mutual capacitance may vary. There may be one or more of these intersecting points around each vertex that generates a mutual capacitance compound change. For simplicity, in FIG. 2, there is only one intersecting point near each vertex that generates the mutual capacitance compound change, but the present invention is not limited to this. In other embodiments of the present invention, there can be one or more neighboring intersecting points that contribute to the mutual capacitance compound change.

Figure 3A:
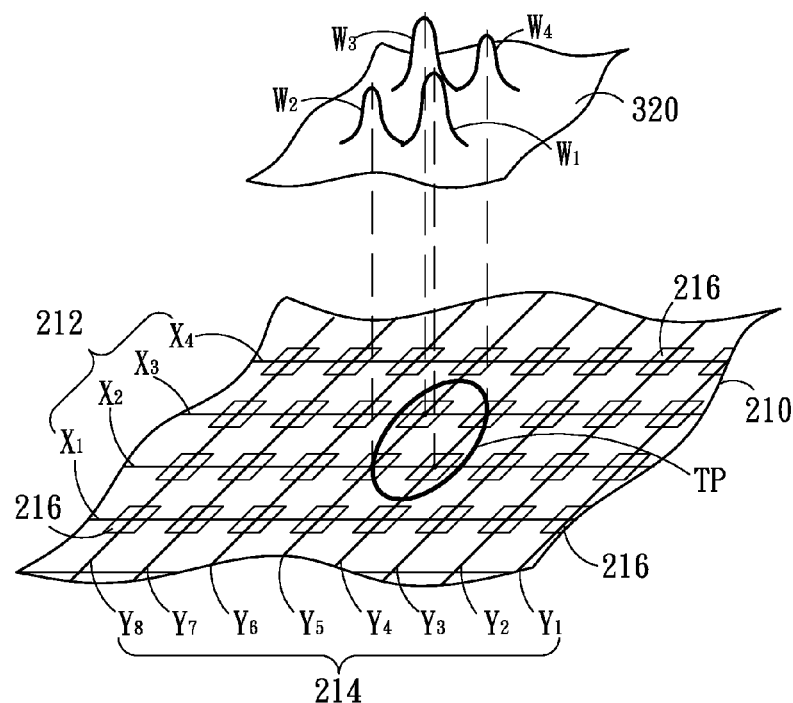
FIG. 3 is a schematic block diagram depicting a touch panel with multi-touch operations and a capacitance image according to another preferred embodiment of the present invention.

Referring to FIG. 3A, a diagram depicting multi-touch operations and a capacitance image according to another preferred embodiment of the present invention is shown. A touch panel 210 has the same structure as the touch panel 210 shown in FIG. 2. When there is one touch point (TP) on the touch panel 210, and this TP crosses over several intersecting points of the first and second conductive lines 212 and 214 or several conductors 216 (e.g. (X2,Y5), (X2,Y6), (X3,Y5) and (X3, Y6)), signal (current, voltage, capacitance or charge coupling) changes at these intersecting points or conductors 216. From the capacitance image 320 it can be seen that there are four significant capacitance image waves W1, W2, W3 and W4. These capacitance image waves W1, W2, W3 and W4 are obtained from three-mutual-capacitance compound changes, which is obviously larger than just one mutual capacitance change. As a result, not only can they be distinguished from each other, the real points, that is, the coordinates of these points (P1(X1,Y4) and P2(X3,Y6)) can also be determined from these compound changes, especially three or more real points can be simultaneously determined.

Figure 3B:
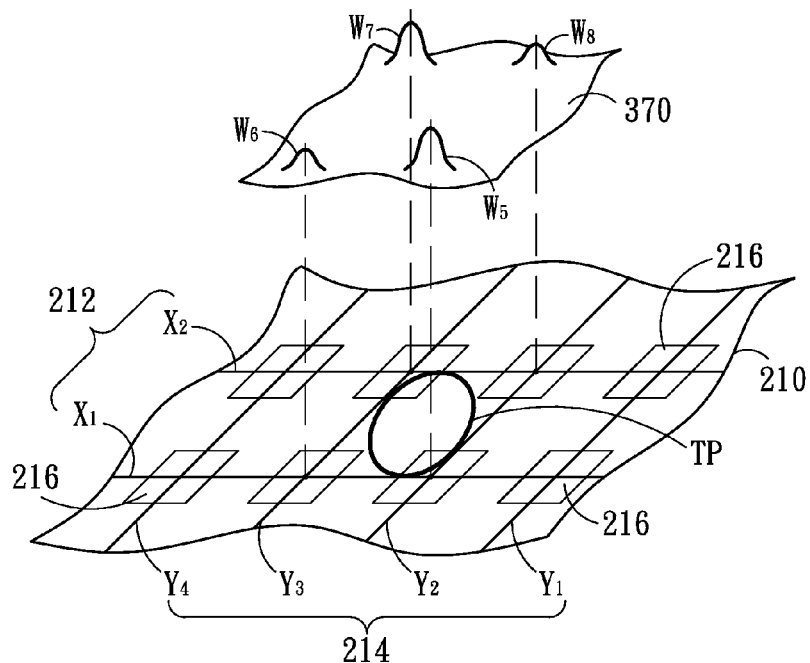

Referring to FIG. 3B, a diagram depicting multi-touch operations and a capacitance image according to yet another preferred embodiment of the present invention is shown. A touch panel 210 has the same structure as the touch panel 210 shown in FIG. 2, but in a zoomed-in view. When there is a TP on the touch panel 210, and this TP does not touch any intersecting point but covers only a few conductors 216 (e.g. some portions of the conductors 216 at (X1, Y2) and (X2, Y3)), signals are changed by the intersecting points or conductors 216 around the TP. From the capacitance image 370 it can be seen that there are four capacitance image waves W5, W6, W7 and W8. These capacitance image waves W5, W6, W7 and W8 are obtained from sensing three-mutual-capacitance compound changes, which is obviously larger than just one mutual capacitance change. In this way, locations between intersecting points can be determined, not just an indication of close to or near a certain intersecting point. The locations can be calculated by interpolation for center of mass. For example, assuming that the capacitance image waves W5, W6, W7 and W8 are at (X2,Y5), (X2, Y6), (X3, Y5) and (X3, Y6), respectively, then the coordinates for the TP location are X=(X2 W1+X2 W2+X3 W3+X3 W4)/(X2+X2+X3+X3), and Y=(Y5 W1+Y6 W2+Y5 W3+Y6 W4)/(Y5+Y5+Y6+Y6).

It should be noted that since sensing of a three-mutual-capacitance compound change is easier (larger and more obvious) than sensing of a single mutual capacitance change. Thus, embodiments of the present invention can achieve similar resolution with fewer conductive lines. In addition, the sensed data for determining a touch event or not is not limited to digital data, so analog data can be sensed and used to estimate the pressure at a touched location. If a finger or a flexible material suppresses a touch panel 210, the greater the force of suppression, the larger the area of contact between the finger or material and the touch panel 210, and in turns the larger the mutual capacitance compound change. When sensing a touch event, the magnitude, variation, variation trend of the pressure can also be determined, which can be used to identify gestures associated with pressure or pressure variation, for example, identify an approaching or leaving finger based on an increasing or decreasing pressure trend, or identify movement of a finger based on pressures increased at one side and decreased at the other side of the finger.

Figure 4:
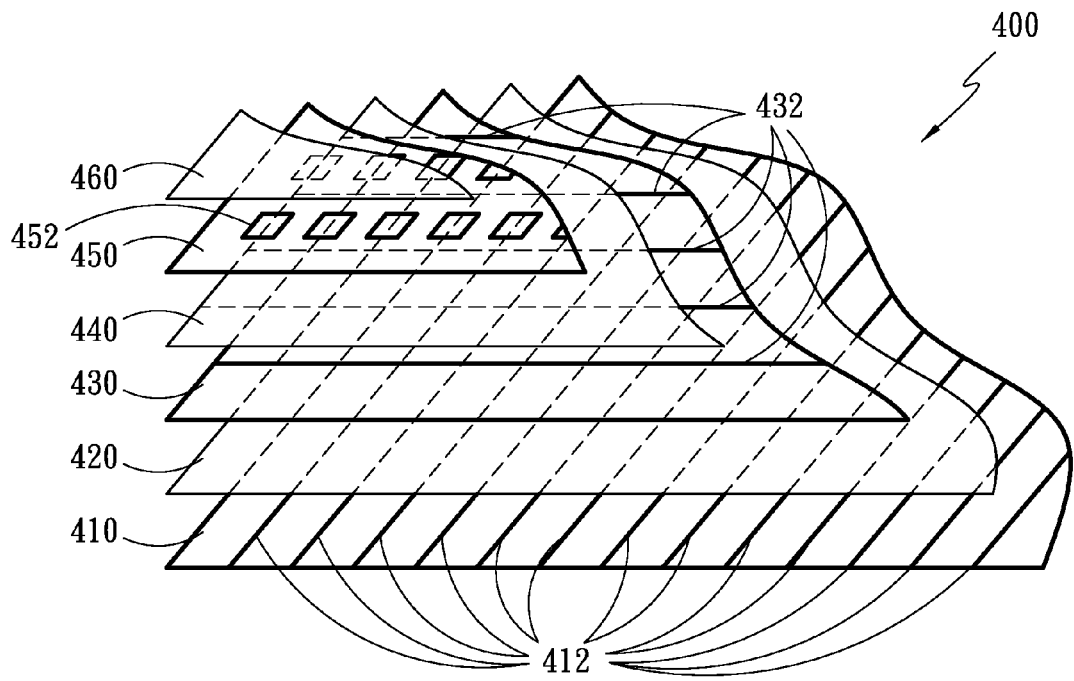
FIG. 4 is a schematic block diagram depicting a structure of the touch panel according to a preferred embodiment of the present invention.

Referring to FIG. 4, a diagram depicting decomposition of a structure 400 according to a preferred embodiment of the present invention is shown. A plurality of first conductive lines 412 is electrically isolated from each other and on the first axis layer 410. A plurality of second conductive lines 432 is electrically isolated from each other and on the second axis layer 430. The first and second conductive lines 412 and 432 are electrically isolated from and stacked on each other, forming a plurality of intersecting points. A first dielectric layer 420 is interposed between the first and second conductive lines 412 and 432. The first and second conductive lines 412 and 432 perpendicularly cross each other. A plurality of electrical conductors 452 is electrically isolated from each other and on an electrical conductor layer 450. These conductors 452 each cross a pair of intersecting first and second conductive lines 412 and 432 and are around these intersecting points. The first and second conductive lines 412 and 432 and the electrical conductors 452 are electrically isolated from each other. A second dielectric layer 440 is interposed between the second conductive lines 432 and the electrical conductors 452. A third dielectric layer 460 is provided on top of the first and second conductive lines 412 and 432 and the electrical conductors 452. In this embodiment, the electrical conductors 452 can be alternatively placed between the first and second conductive lines 412 and 432, or beneath them. In a preferred embodiment of the present invention, the relative positions of the conductors 452 are above the first and second conductive lines 412 and 432. In addition, it is appreciated by one skilled in the art that the third dielectric layer 460 is optional. In another embodiment of the present invention, there are only first and second conductive lines 412 and 432, electrical conductors 452, a first dielectric layer 420 and a second dielectric layer 440, wherein the first dielectric layer 420 is interposed between the first and second conductive lines 412 and 432, and the second dielectric layer 440 is interposed between the electrical conductors 452 and the first and second conductive lines 412 and 432. As described before, the relative positions of these conductors 452 can be between the first and second conductive lines 412 and 432 or above or beneath them.

Figure 5:
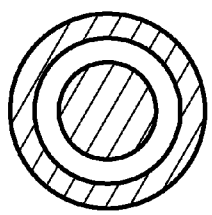
FIG. 5 is a schematic block diagram depicting the electrical conductors according to a preferred embodiment of the present invention.
Figure 5:
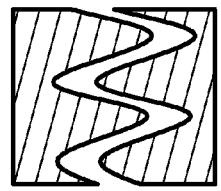
Figure 5:
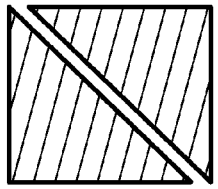
Figure 5:
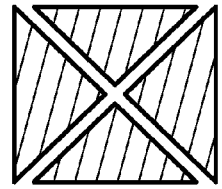

Referring to FIG. 5, a diagram depicting several preferred structures of an electrical conductor according to the present invention is shown. An electrical conductor consists of (a)

two concentric circles comprising solid-circular and ring-shape sub-conductors; (b) a rectangular conductor comprising two inner zigzag sub-conductors; (c) a rectangular conductor comprising two triangular sub-conductors; and (d) a rectangular conductor comprising four triangular sub-conductors. The above embodiment is used only to illustrate a few combinations of sub-conductors for forming an electrical conductor; the present invention is not limited to these, but can have one or more elements with any geometric shapes. Thus, an electrical conductor of the present invention can be a single body or a compound body made up of a plurality of separated elements crossing an intersecting point.

Figure 6:
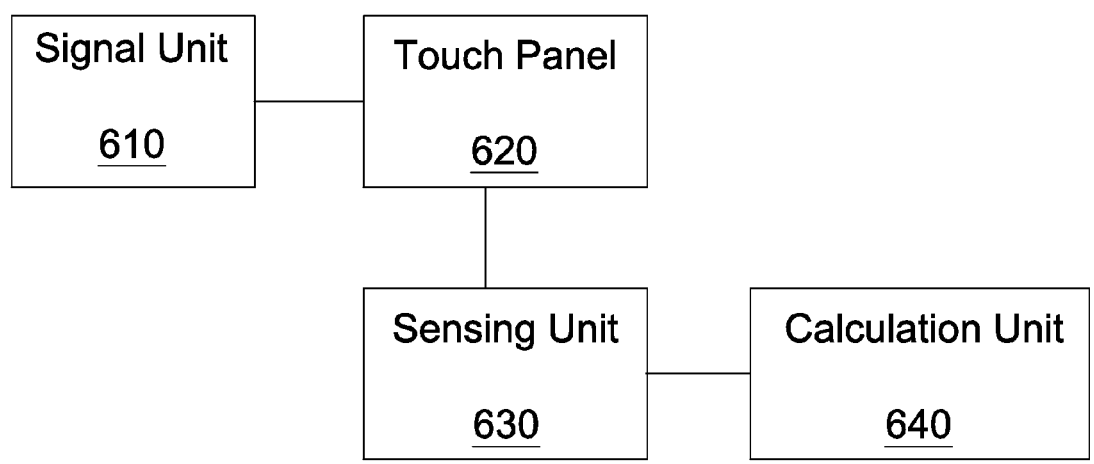
FIG. 6 is a schematic block diagram depicting a system according to a preferred embodiment of the present invention.

Referring to FIG. 6, a schematic block diagram illustrating a system according to a preferred embodiment of the present invention is shown. Referring to descriptions associated with FIG. 2 at the same time, a signal unit 610 provides an electrical signal to a first conductive line 212 of a touch panel 620 (210 in FIG. 2), so that the first conductive line 212 is capacitively coupled with its intersecting second conductive line 214, and an electrical conductor 216 around the intersecting point of the first conductive line 212 is capacitively coupled with the first conductive line 212 and the second conductive line 214 with which the first conductive line 212 intersects, respectively. A first sensing unit 630 receives a plurality of first sensing signals from the second conductive lines 214 before at least one of the electrical conductors 216 capacitively or contact couples with an object. A second sensing unit (the first sensing unit 630 in this embodiment) receives a plurality of second sensing signals from the second conductive lines 214 when at least one of the electrical conductors 216 capacitively or contact couples with the object. A calculation unit 640 calculates at least one touched location based on the first and second sensing signals. For example, by comparing the first and second sensing signals for each intersecting point, find any intersecting point with difference larger than a predetermined value, and then the touched location can be determined from these intersecting points. The first and second sensing signals respectively include the capacitive-coupling compound value of the first conductive lines 212, the second conductive lines 214 and the electrical conductors 216 before and during coupling.

In this embodiment, the way the signal unit 610 drives an electrical signal may include sequentially drives an electrical signal to each one of the first conductive lines 212, or simultaneously drives an electrical signal to a plurality of first conductive lines 212, a plurality of second conductive lines 214 or a combination of the first and second conductive lines 212 and 214. The sensing of the first and second sensing units includes sensing a capacitive coupling of at least one of the intersecting points (as in FIG. 3A) and a capacitive coupling between intersecting points (as in FIG. 3B) and providing the calculation unit 640 with at least one location (expressed in a pair of coordinates) and a location between at least a pair of coordinates. The calculation unit 640 then calculates the pressure at one or more touched location based on the first and second sensing signals.

In another preferred embodiment, a first sensing unit 630 receives a plurality of first sensing signals from a plurality of first conductive lines 212 and a plurality of second conductive lines 214 before at least one of the electrical conductors 216 capacitively or contact couples with an object. A second sensing unit (the same first sensing unit 630 in this embodiment) receives a plurality of second sensing signals from these first and second conductive lines 212 and 214 when at least one of the electrical conductors 216 capacitively or contact couples with the object. A calculation unit 640 calculates at least one touched location based on the first and second sensing signals. The first and second sensing signals respectively include the capacitive-coupling compound values of the first conductive lines 212, the second conductive lines 214 and the electrical conductors 216 before and during coupling. In this embodiment, the way the signal unit 610 drives an electrical signal may include sequentially drives an electrical signal to each one of the first and second conductive lines 212 and 214, or simultaneously drives an electrical signal to these first and second conductive lines 212 and 214. The first and second sensing signals are obtained when the electrical signal is driven. The sensing of the first and second sensing units includes sensing a capacitive coupling of at least one of the intersecting points (as in FIG. 3A) and a capacitive coupling between intersecting points (as in FIG. 3B) and providing the calculation unit 640 with at least one location (expressed in a pair of coordinates) and a location between at least a pair of coordinates. The calculation unit 640 then calculates the pressure at one or more touched location based on the first and second sensing signals. In addition, the signal unit 610 may also drive electrical signals having different phases, waveforms or frequencies to the first and second conductive lines 212 and 214, respectively. For example, at the same time, the first conductive lines 212 and the second conductive lines 214 are simultaneously driven with electrical signals having different phases, waveforms or frequencies.

Figure 7A:
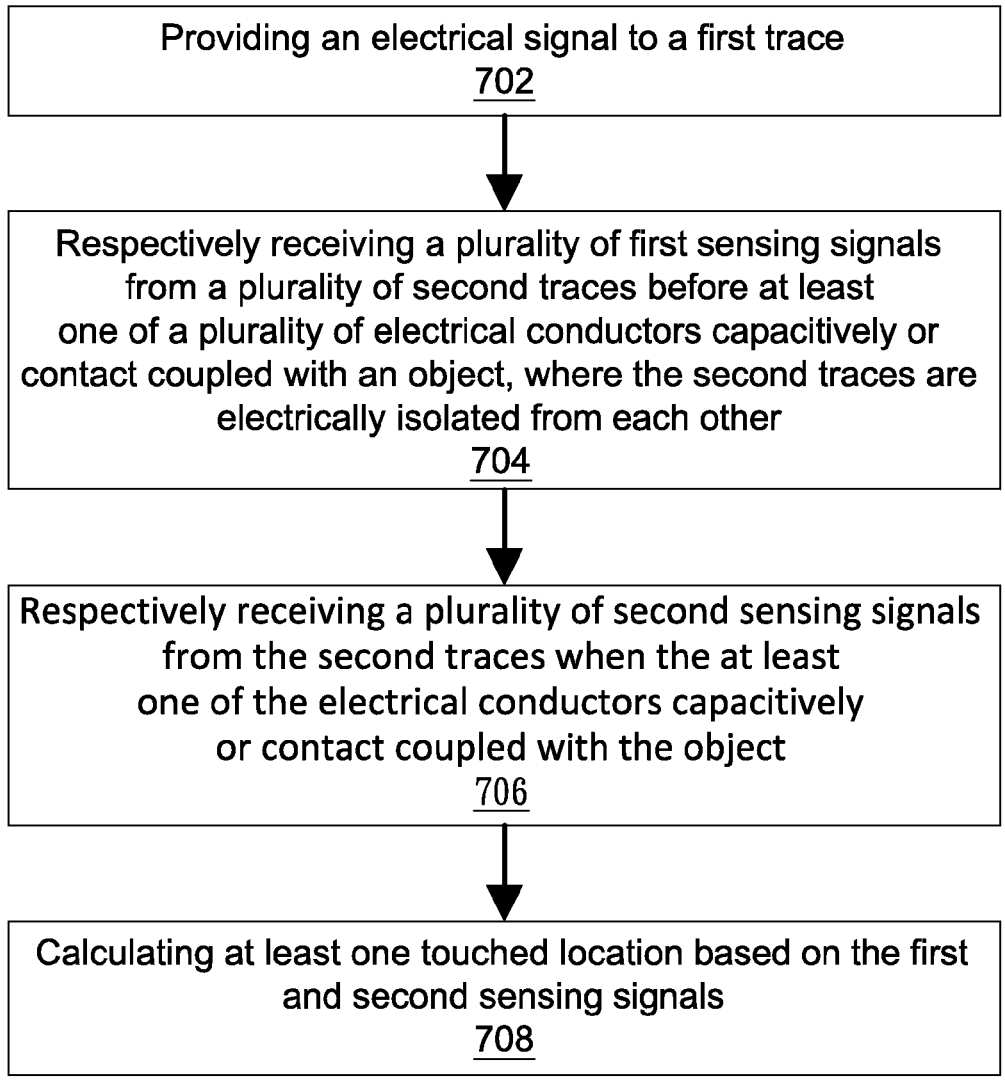
FIG. 7A to 7C are flowing diagrams according to a preferred embodiment of the present invention.

Referring to FIG. 7A, a flowchart illustrating steps of a preferred embodiment of the present invention is shown. Also referring to FIGS. 6 and 2, in step 702, the signal unit 610 provides an electrical signal to a first conductive line 212. In step 704, before at least one of the electrical conductors 216 capacitively or contact couples with an object, the sensing unit 630 respectively receives a plurality of first sensing signals from the plurality of second conductive lines 214. In step 706, the second sensing unit 630 respectively receives a plurality of second sensing signals from the second conductive lines 214 when at least one of the electrical conductors 216 capacitively or contact couples with the object. In step 708, the calculation unit 640 calculates at least one touched location based on the first and second sensing signals, wherein the first and second sensing signals respectively include the capacitive-coupling compound values of the first conductive lines 212, the second conductive lines 214 and the electrical conductors 216 before and during coupling. In this embodiment, when the first conductive line 212 is plural, the signal unit 610 can sequentially provides the electrical signal, and the calculation unit 640 may further include calculating the pressure at one or more touched location.

Figure 7B:
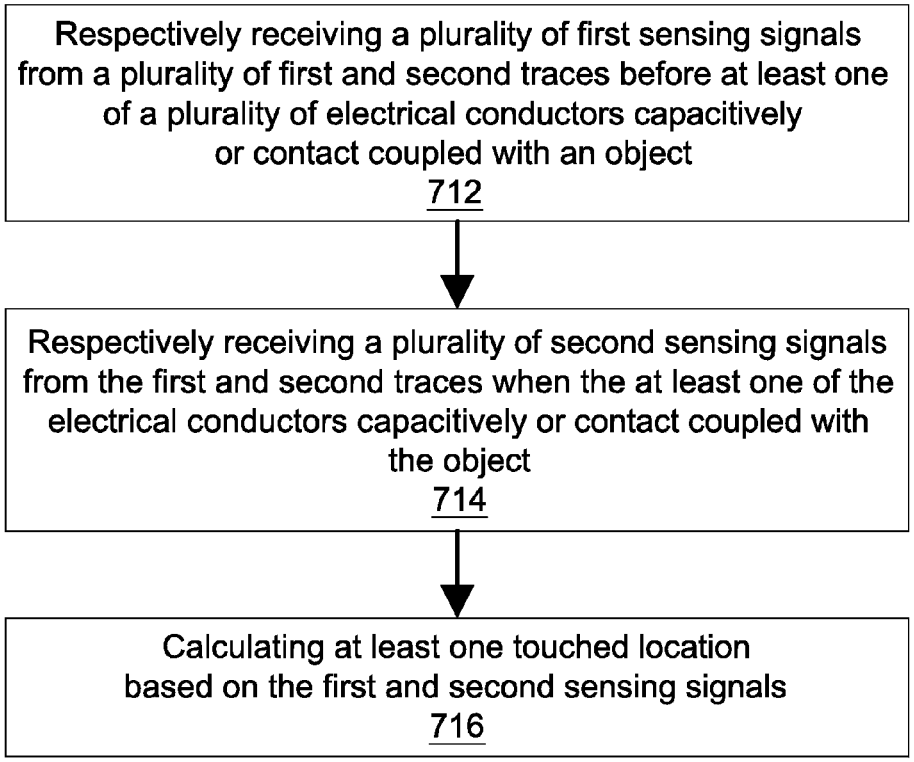

Referring to FIG. 7B, a flowchart illustrating steps of another preferred embodiment of the present invention is shown. Also referring to FIGS. 6 and 2, in step 712, before at least one of the electrical conductors 216 capacitively or contact couples with an object, the sensing unit 630 respectively receives a plurality of first sensing signals from the plurality of first conductive lines 212 and the plurality of second conductive lines 214. In step 714, the second sensing unit 630 respectively receives a plurality of second sensing signals from the plurality of first conductive lines 212 and the plurality of second conductive lines 214 when at least one of the electrical conductors 216 capacitively or contact couples with the object. In step 716, the calculation unit 640 calculates at least one touched location based on the first and second sensing signals, wherein the first and second sensing signals respectively include the capacitive-coupling compound values of the first conductive lines 212, the second conductive lines 214 and the electrical conductors 216 before and during coupling. In this embodiment, the first and second sensing signals are obtained when the electrical signal is driven onto the first and second conductive lines 212 and 214, and the way the signal unit 610 provides electrical signals can include sequential or simultaneous provision of signals to the first and second conductive lines 212 and 214, and the calculation unit 640 may further include calculating the pressure at one or more touched location.

Referring to FIGS. 2 and 6, a touch panel 210 (620 in FIG. 6) has a plurality of first conductive lines 212 and a plurality of second conductive lines 214, forming a plurality of intersecting points therebetween. A plurality of electrical conductors 216 crosses these intersecting points. A sensing unit 630 senses the compound signals of these intersecting points, which is affected by the capacitive coupling of the electrical conductors 216. A mutual-capacitance coupling exists between each pair of intersecting first and second conductive lines 212 and 214, and the compound signal of each intersecting point is the capacitive-coupling signal between each electrical conductor 216 and the first and second conductive lines 212 and 214 it crosses. A calculation unit 640 calculates at least one touched location based on the changes in these compound signals. In a preferred embodiment of the present invention, when there are two touched locations (e.g. P1 and P2) on the touch panel 210 that form a pair of diagonal real vertices of a virtual bounding parallelogram P1G1P2G2, then the dimension of the electrical conductors 216 that crosses the intersecting points P1, G1, P2 and G2 will determine the signal difference between the intersecting points around the real vertices (e.g. P1 and P2) and the intersecting points around the pseudo vertices (e.g. G1 and G2). That is, the dimension of the electrical conductors not only affects the magnitude of compound signals at the intersecting points P1, G1, P2 and G2, but also affects the difference between compound signals at the intersecting points P1, G1, P2 and G2. Moreover, the calculation unit 640 distinguishes at least a group of neighboring intersecting points based on the intensity in the compound signal changes, and each group of intersecting points corresponds to one of at least one touched location. Based on the distances of each vertex from the neighboring intersecting points, the number of neighboring intersecting points generating a mutual-capacitance compound change may be one or more.

Referring again to FIGS. 2 and 6, a signal unit 610 drives a touch panel 620 (210 in FIG. 2), and the touch panel 620 includes a plurality of first and second conductive lines 212 and 214 forming a plurality of intersecting points. A plurality of electrical conductors 216 crosses these intersecting points. A sensor unit 630 senses compound signals of these interesting points that are affected by the capacitive coupling of these electrical conductors 216. A calculation unit 640 calculates at least one touched location based on the changes of these compound signals, wherein the first and second conductive lines 212 and 214 are capacitively coupled. Each electrical conductor 216 crosses one of the intersecting points. The compound signal of each intersecting point is the capacitive coupling signal between each electrical conductor 216 and the first and second conductive lines 212 and 214 crossed by the electrical conductor 216. In a preferred embodiment of the present invention, when there are two touched locations (e.g. P1 and P2) on the touch panel 210 that form a pair of diagonal real vertices of a virtual bounding parallelogram P1G1P2G2, then the dimension of the electrical conductors 216 that crosses the intersecting points P1, G1, P2 and G2 will determine the signal difference between the intersecting points around the real vertices (e.g. P1 and P2) and the intersecting points around the pseudo vertices (e.g. G1 and G2). Moreover, the calculation unit 640 distinguishes at least a group of neighboring intersecting points based on the intensity in the compound signal changes, and each group of intersecting points corresponds to one of at least one touched location. Based on the distances of each vertex from the neighboring intersecting points, the number of neighboring intersecting points generating a mutual-capacitance compound change may be one or more.

Figure 7C:
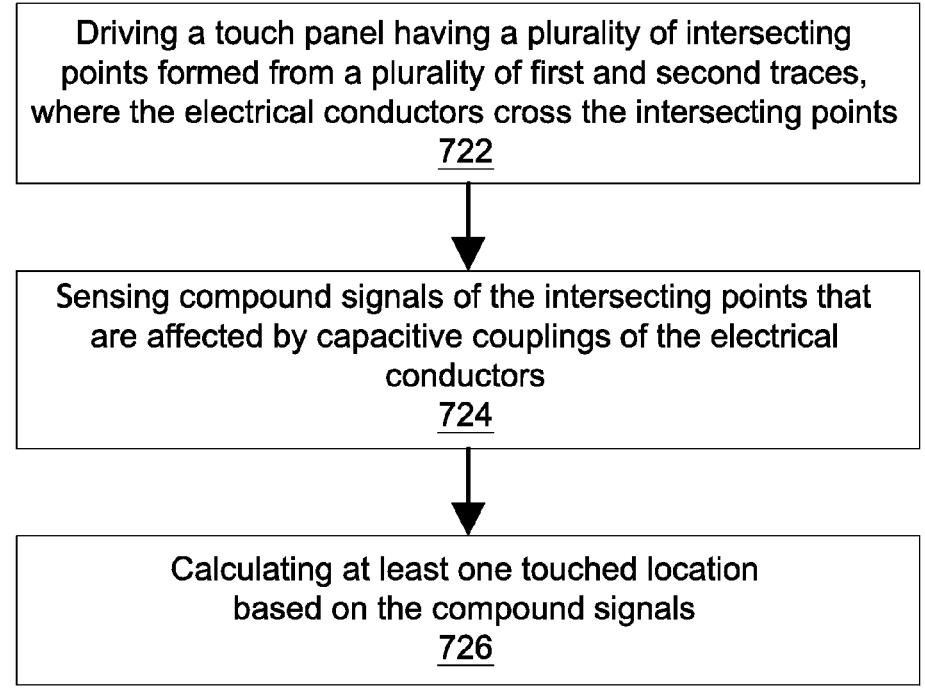

Referring to FIG. 7C, a flowchart illustrating steps of yet another preferred embodiment of the present invention is shown. Also referring to FIGS. 6 and 2, in step 722, the signal unit 610 drives the touch panel 620, wherein the touch panel 620 (210 in FIG. 2) includes a plurality of first and second conductive lines 212 and 214 forming a plurality of intersecting points, which are crossed by a plurality of electrical conductors 216. In step 724, the sensing unit 630 senses compound signals of these intersecting points, which are affected by the capacitive coupling of the electrical conductors 216. In step 726, the calculation unit 640 calculates at least one touched location based on the changes in these compound signals, wherein the first and second conductive lines 212 and 214 are capacitively coupled. Each electrical conductor 216 crosses one of the intersecting points. The compound signal of each intersecting point is the capacitive coupling signal between each electrical conductor 216 and the first and second conductive lines 212 and 214 crossed by the electrical conductor 216. In addition, when there are two touched locations (e.g. P1 and P2) on the touch panel 210 that form a pair of diagonal real vertices of a virtual bounding parallelogram P1G1P2G2, then the dimension of the electrical conductors 216 that crosses the intersecting points P1, G1, P2 and G2 will determine the signal difference between the intersecting points around the real vertices (e.g. P1 and P2) and the intersecting points around the pseudo vertices (e.g. G1 and G2). In this embodiment, the step of the calculation unit 640 calculating at least one touched location includes comparing the compound signal change of each electrical conductor 216 against a threshold value, wherein the dimension of the electrical conductors determines this threshold value. In another preferred embodiment, the step of the calculation unit 640 calculating at least one touched location includes distinguishing at least a group of neighboring intersecting points based on the intensity in the compound signal changes, and calculating one of at least one touched location based on the signal change of each group of intersecting points. Based on the distances of each vertex from the neighboring intersecting points, the number of neighboring intersecting points generating a mutual-capacitance compound change may be one or more.

Referring again to FIGS. 2 and 6, the present invention provides a capacitive sensing device. This capacitive sensing device has a plurality of first and second conductive lines forming a plurality of intersecting points, and it uses the capacitive couplings of these intersecting points to detect at least one touched location, wherein any two touched locations (e.g. P1 and P2) forms a pair of diagonal real vertices of a virtual bounding parallelogram P1G1P2G2, and a pair of pseudo vertices G1 and G2 forms the other pair of diagonal of the virtual bounding parallelogram P1G1P2G2. This embodiment is characterized in that the device further includes a plurality of electrical conductors 216 that cross the intersecting points, and the dimension of the electrical conductors determines the signal difference between the intersecting points around the real vertices (e.g. P1 and P2) and the intersecting points around the pseudo vertices (e.g. G1 and G2). Moreover, the present embodiment further includes a sensing unit 630 that senses compound signals of these intersecting points, which are affected by the capacitive coupling of the electrical conductors 216, and each electrical conductor crosses 216 one of these intersecting points, and the compound signal of each intersecting point is the capacitive coupling signal between each electrical conductor 216 and the first and second conductive lines 212 and 214 which it crosses. Moreover, the present embodiment further includes a calculation unit 640, which distinguishes at least a group of neighboring intersecting points based on the intensity in the compound signal changes, and each group of intersecting points corresponds to one of at least one touched location. Based on the distances of each vertex from the neighboring intersecting points, the number of neighboring intersecting points generating a mutual-capacitance compound change may be one or more.

In the embodiments of the present invention, the electrical signals can be a sinusoidal wave, square wave or other waveforms, and may be provided to the first or second conductive line in fixed current or voltage for detecting the voltage, current, capacitance or charge coupling on the first or second conductive line. That is, the electrical signals are provided as fixed voltage to sense a voltage or current; as fixed current to sense a voltage or current or any of the above methods to sense a capacitance. The present invention does not put a limit on how to measure the first and second sensing signals or the compound signals of the intersecting points.

In summary, the present invention uses a plurality of electrical conductors that increases the difference between the compound signals of the intersecting points around each touched location and the compound signals of the intersecting points around the ghost points. The larger the dimension of the electrical conductors, the greater the difference. Thus, a predetermined range can be set to filter out intersecting points having compound signals or compound signal changes that fall within this range.

In an embodiment of the present invention, a predetermined range can be a range of the signals at the intersecting points, so as to distinguish the intersecting points around touched locations from those around ghost points. In another embodiment of the present invention, the predetermined range can be a range of the amount of signal changes at the intersecting points, so as to distinguish the intersecting points around touched locations from those around ghost points. The amount of signal changes can be the amount of changes between signals before and after an object touches or gets near a touch panel.

Therefore, the best mode of the present invention is a capacitive sensing device, comprising: a sensing unit detecting changes in charge coupling between a plurality of first conductive lines, a plurality of second conductive lines and a plurality of electrical conductors around or overlaying the intersections of the first conductive lines and the second conductive lines; a signal unit operatively driving an electrical signal to capacitively couple with the sensing unit through one of the first conductive lines, one of the second conductive lines and one of the electrical conductors; and a position identifying unit identifying a position of each object touching or being near the capacitive sensing device by the changes in charge coupling between the first conductive lines, the second conductive lines and the electrical conductors. The position of each object is identified by an image formed from the changes in charge coupling between the first conductive lines, the second conductive lines and the electrical conductors, wherein the position identifying unit identifying the position of each object according to a threshold determined by the dimension of the electrical conductors. The threshold can determine the positions of each pair of objects from four positions. For example, the threshold determines the positions of each pair of objects from four positions according the changes in charge coupling or mutual capacitances between the intersections near two pairs of diagonal within a virtual bounding parallelogram, wherein the threshold determines the position of each pair of objects according the changes in charge coupling or mutual capacitances between the intersections near one pair of diagonal within the virtual bounding parallelogram.

The sensing unit, signal unit and position identifying unit can be integrated into a controller. Thus, the capacitive sensing device can comprise: a plurality of conductive lines including a plurality of first conductive lines and a plurality of second conductive lines that are electrically isolated from each other and stacked on one another; a plurality of electrical conductors around or overlaying the intersections of the conductive lines; and a controller detecting the changes of mutual capacitances between the conductive lines and the electrical conductors. Accordingly, A method for controlling capacitive sensing device, comprising: capacitively coupling each pair of intersecting conductive lines of a plurality of conductive lines by operatively driving one of the pair of intersecting conductive lines and sensing the other of the pair of intersecting conductive lines, wherein the intersection of each pair of intersecting conductive lines is around or overlaid by at least one electrical conductors separately; detecting the changes of mutual capacitances between the conductive lines and electrical conductors; and identifying a position of each object touching or being near the electrical conductors according to a threshold determined by the dimension of the electrical conductors.

Figure 8:
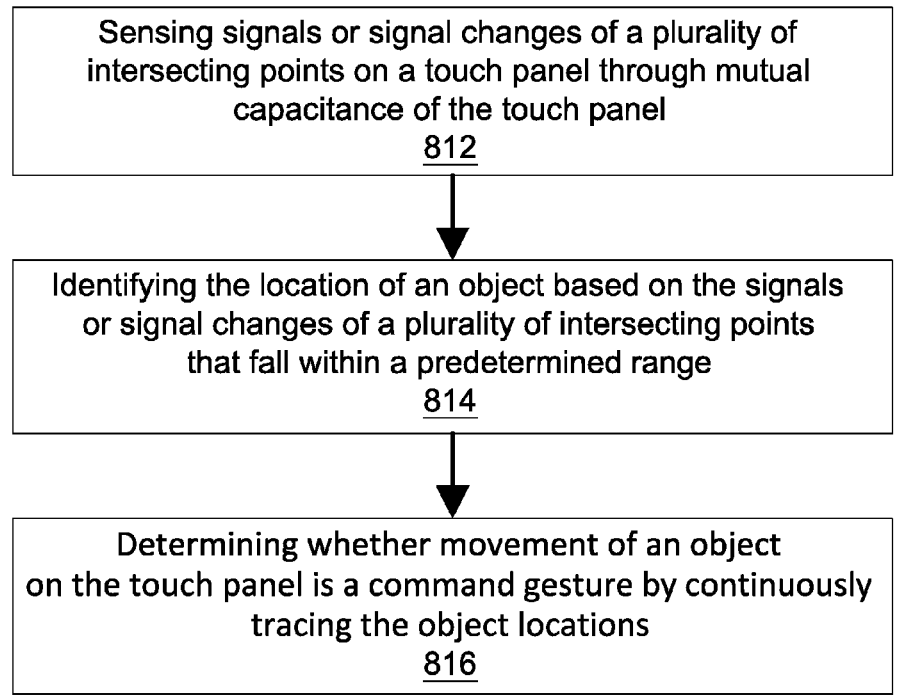
FIG. 8 is a flowing diagram according to another preferred embodiment of the present invention.

Based on the characteristics of capacitive sensing, an object can be sensed not only by touching but also by getting near the capacitive sensing device. The abovementioned intersecting points formed at intersections of a plurality of perpendicularly arranged conductive lines and the plurality of electrical conductors crossing or surrounding the intersecting points can be included in a touch panel. Thus, as shown in step 812 of FIG. 8, in still another preferred embodiment of the present invention, signals or amount of signal changes of intersecting points on the touch panel can be sensed by the mutual-capacitance coupling of the touch panel. As shown in step 814, the location of an object touching or getting near the touch panel can be identified based on the signals or amount of signal changes of intersecting points that fall within a predetermined range. As shown in step 816, a command gesture can be identified by continuously tracing a moving object on the touch panel.

Figure 9:
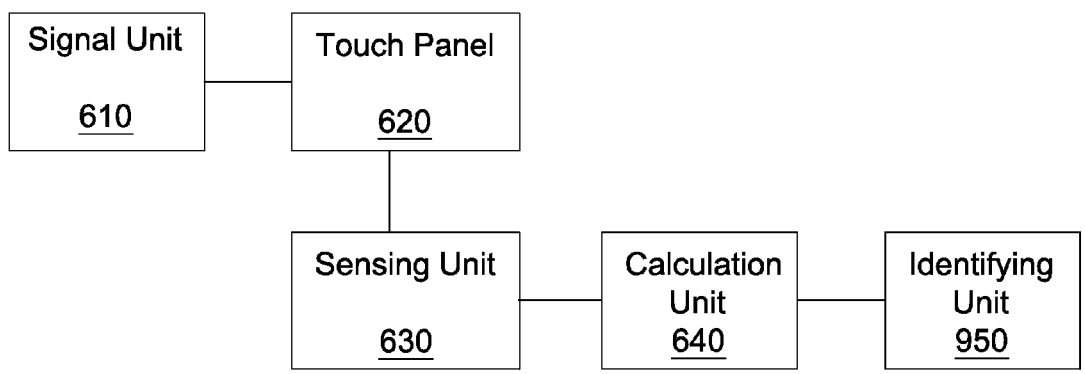
FIG. 9 is a schematic block diagram depicting a system according to another preferred embodiment of the present invention.

In a preferred embodiment of the present invention, the identifying of a command gesture may include continuously recording the locations of an object to construct the trajectory of the object. Then, whether a trajectory is a command gesture is determined by comparing this trajectory with one or more preset gestures. The above identifying of a command gesture can be performed by an identifying unit 950, as shown in FIG. 9.

In another preferred embodiment of the present invention, signals or amount of signal changes of the intersecting points on the touch panel are sensed by the mutual-capacitance coupling of the touch panel so as to construct an image for identifying the locations of objects. In this process, the locations of the objects touching or getting near the touch panel can be identified based on the signals or amount of signal changes of the intersecting points that fall within the predetermined range in the image, or the image is constructed based on the signals or amount of signal changes of the intersecting points that fall within the predetermined range in the image and then the locations of the objects are identified.

In other words, object trajectories can be identified based on the signals or amount of signal changes of the intersecting points that fall within the predetermined range in images individually constructed at different times, or images can first be constructed from intersecting points having signals or amount of signal changes that fall within the predetermined range at different times and then object trajectories are identified.

Examples of the preset gestures are shown in FIGS. 10A to 10F, selected from the group consisting of: movement of an object in one direction; single object rotation; relative movements between a plurality of objects; relative rotations between a plurality of objects, rotation of one object around another; movement of a plurality of objects in the same direction and combinations of the above. In addition, the command can be one selected from the group consisting of: zoom-in, zoom-out, rotate, translate, scroll, cut, paste and delete.

Figure 10A:
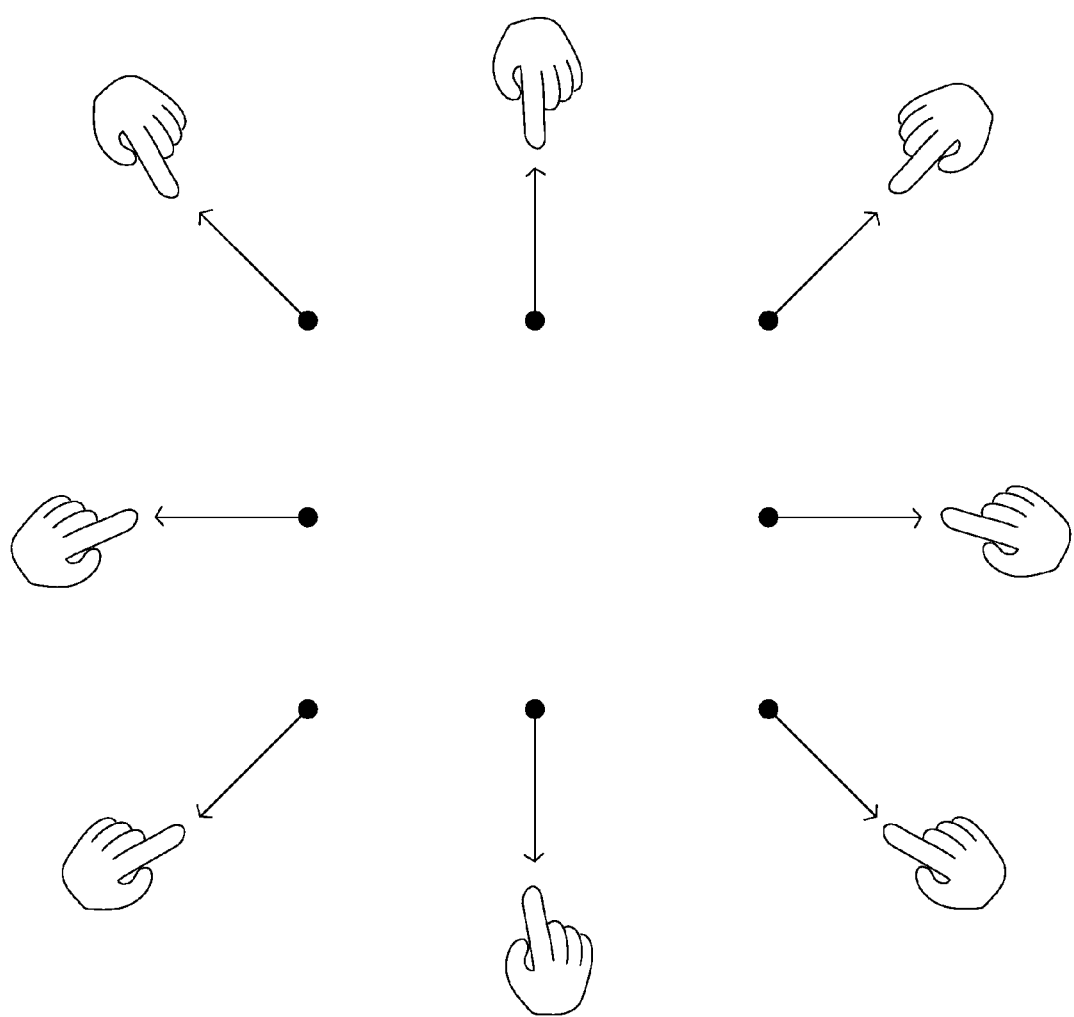
FIG. 10A to 10G are diagrams depicting the gestures according to a preferred embodiment of the present invention.
Figure 10B:
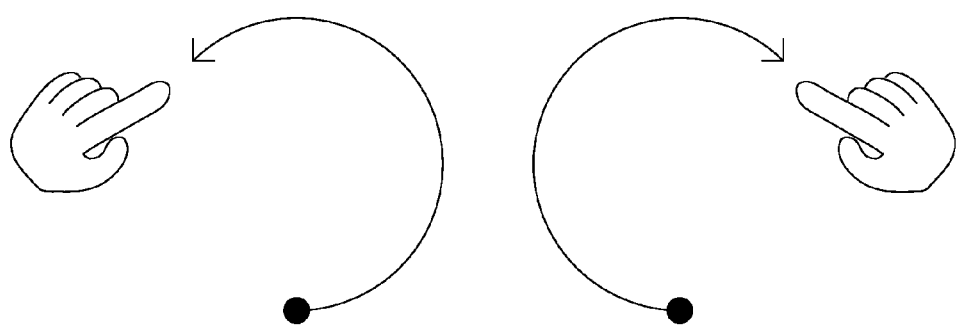
Figure 10C:
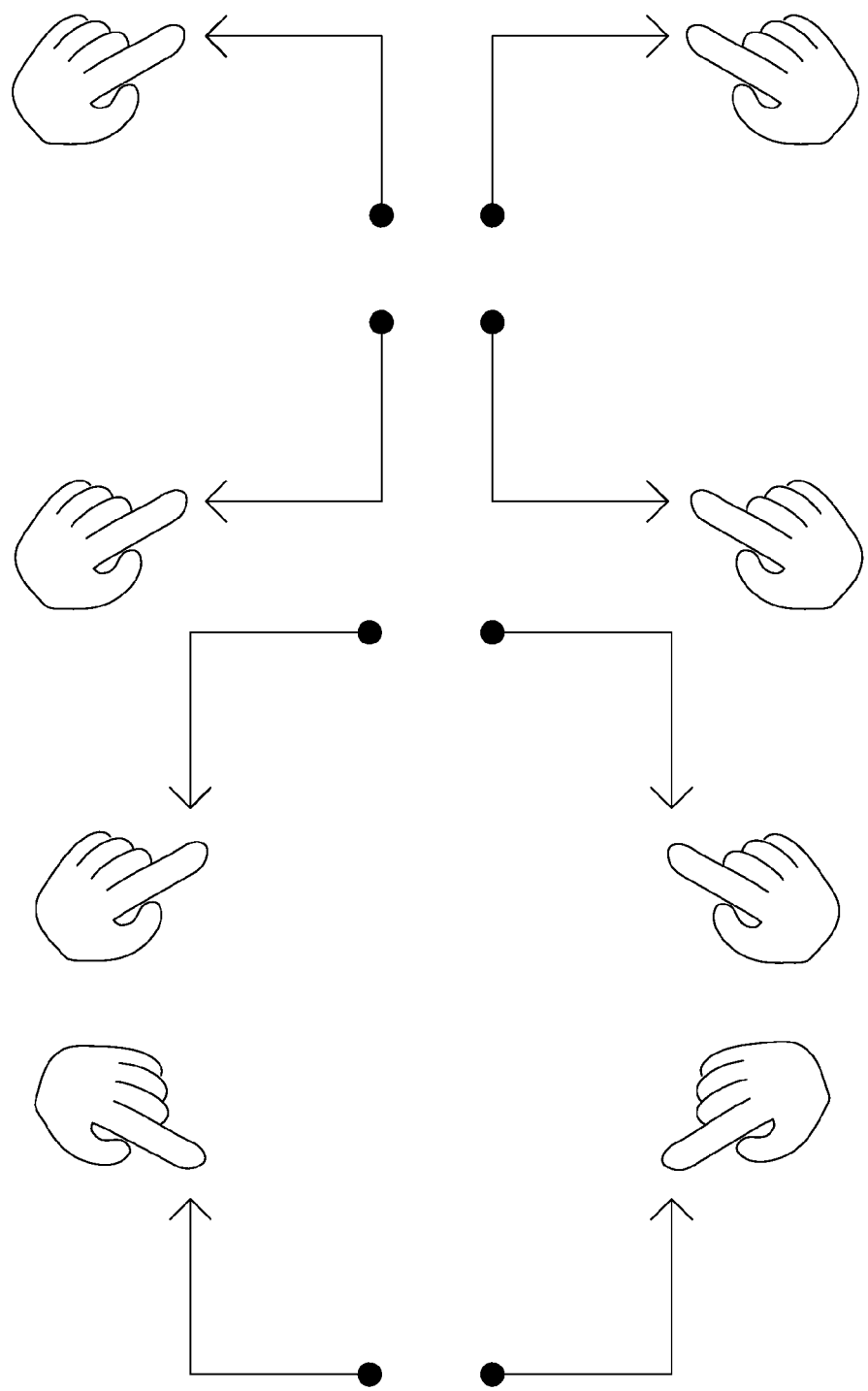
Figure 10D:
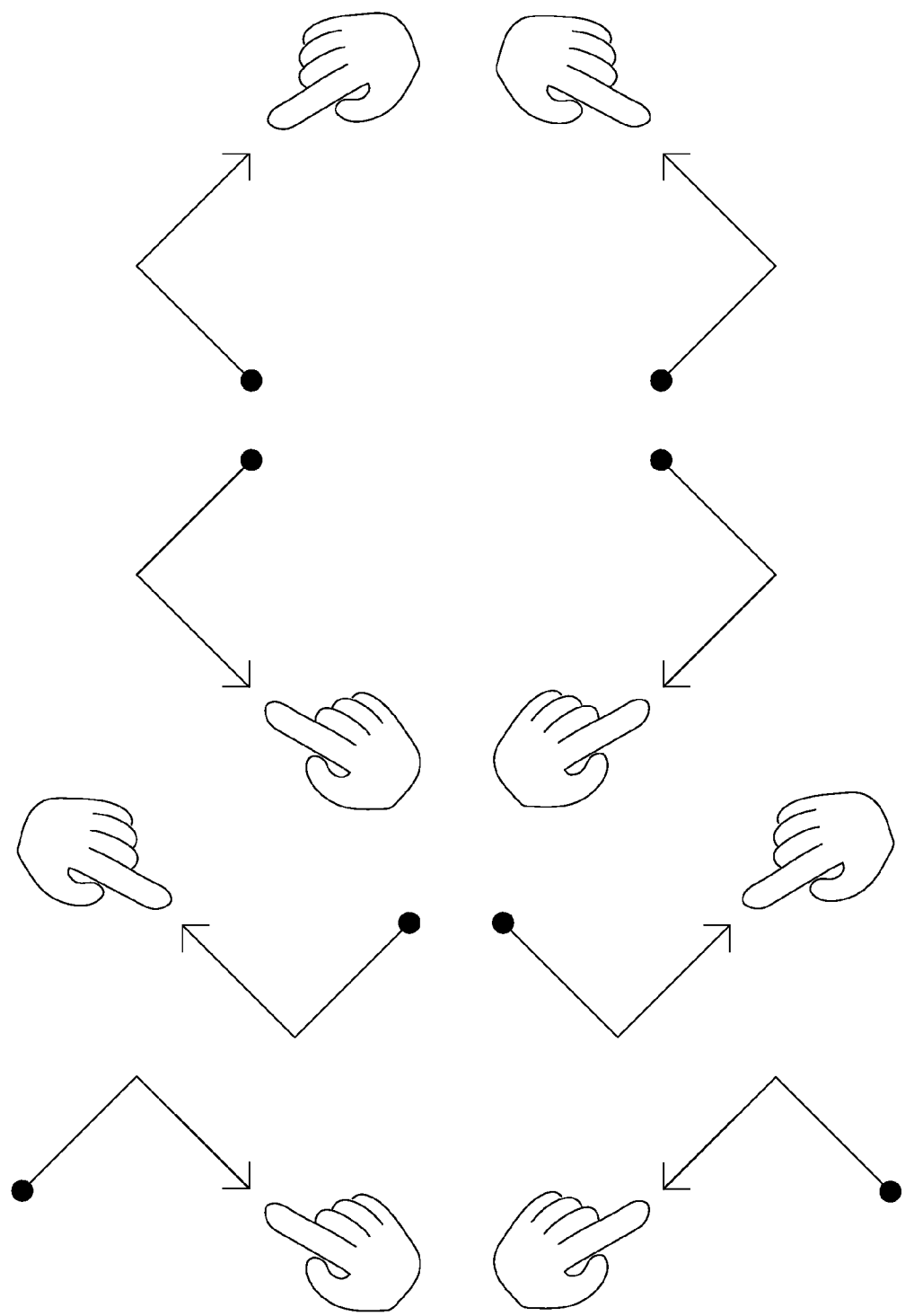
Figure 10E:
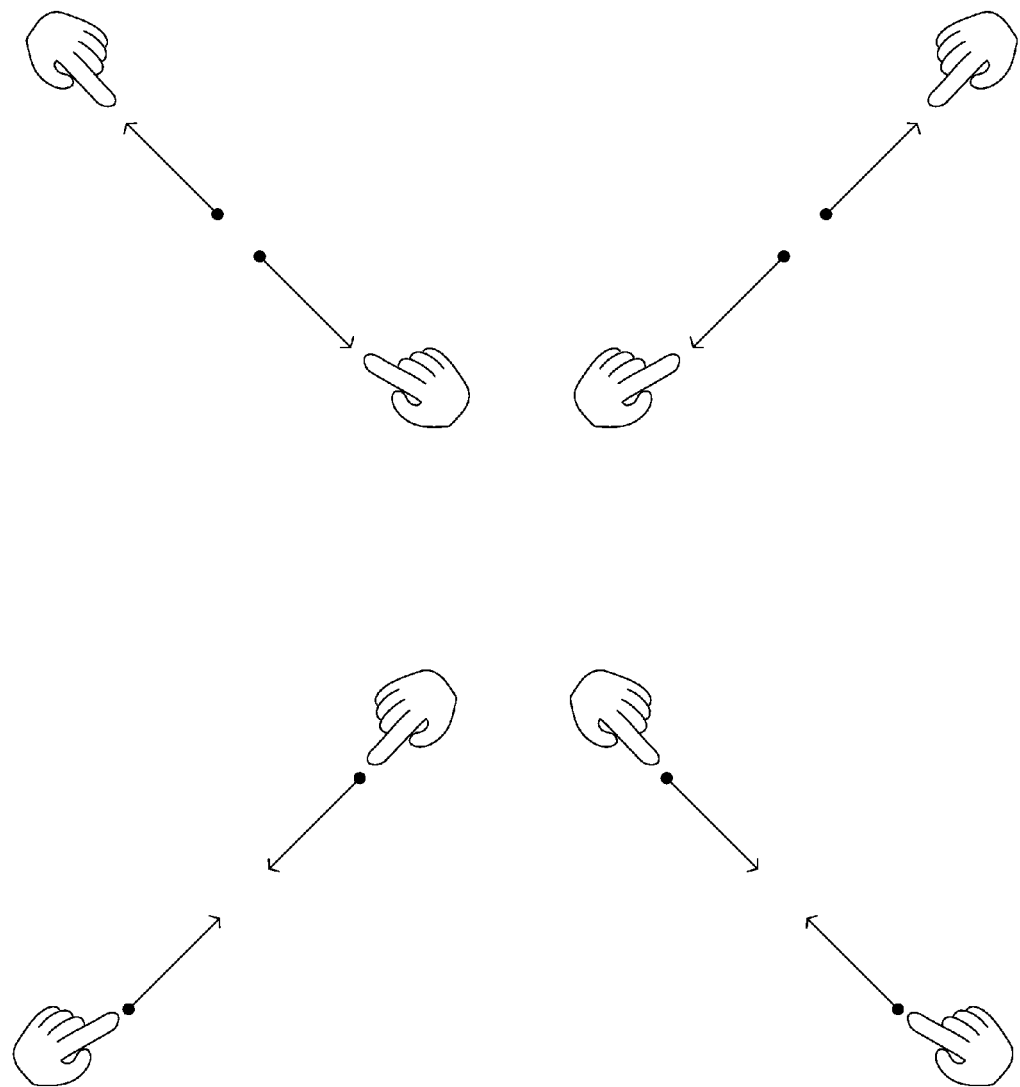
Figure 10F:
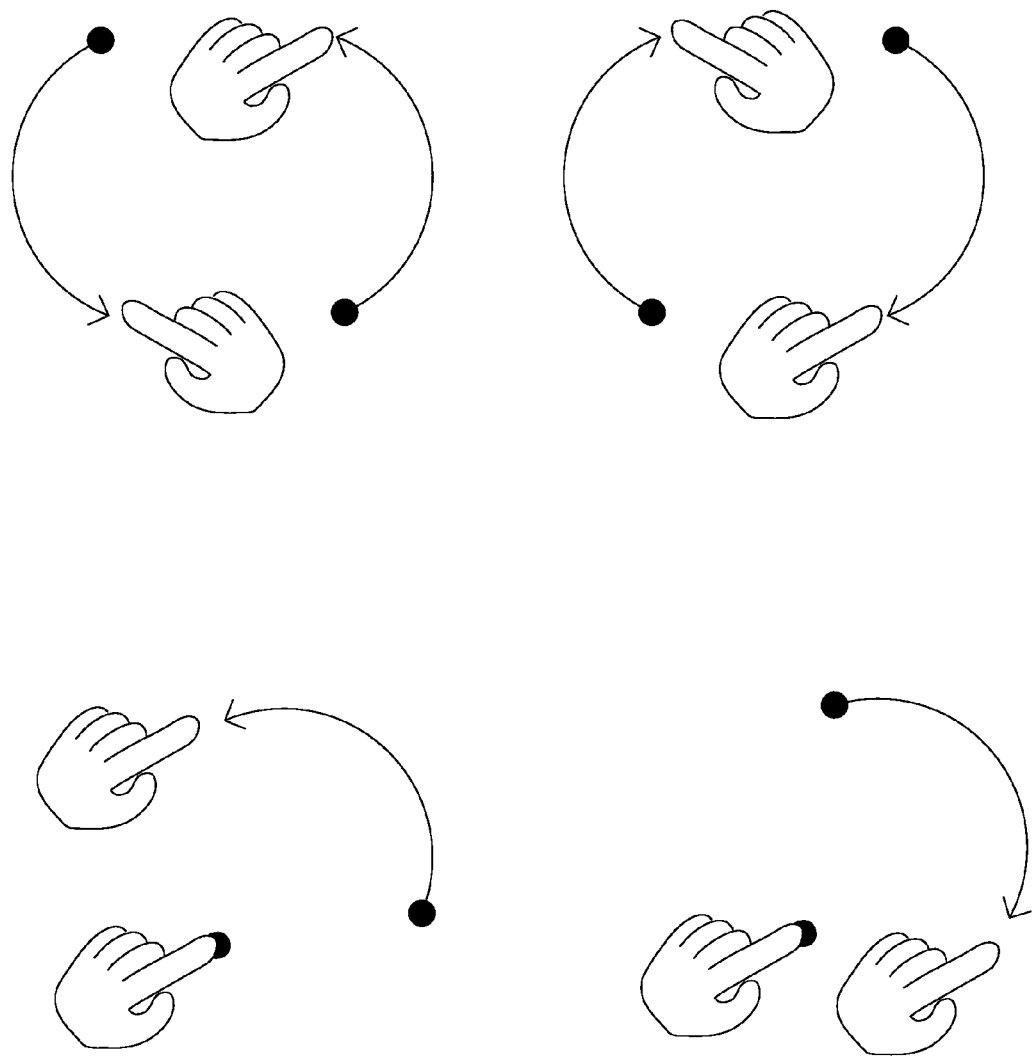
Figure 10G:
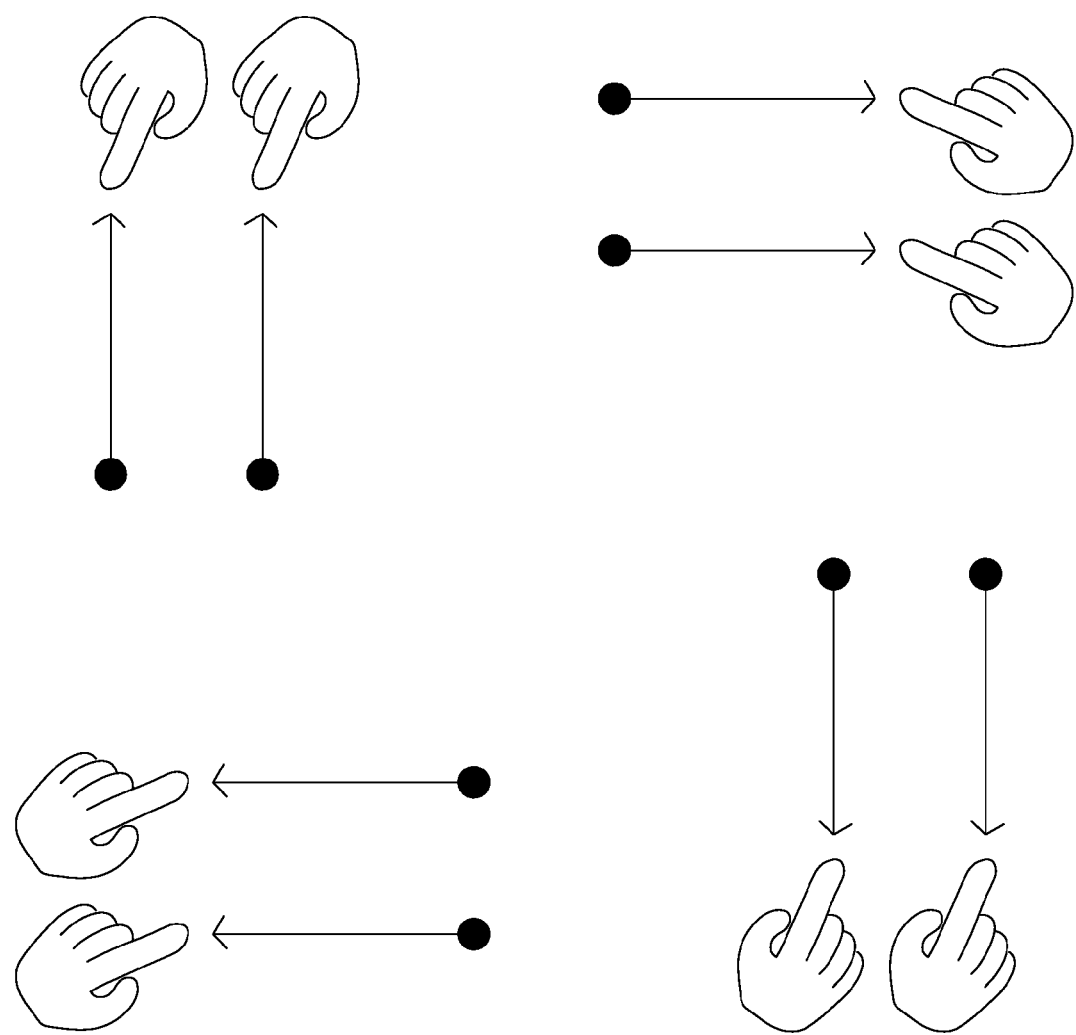

As shown in FIG. 10A, a gesture (command gesture or preset gesture) can be a movement of an object in one direction, the original shown indicates a starting point and the finger indicates direction of movement. Similarly, a gesture can be a clockwise or anticlockwise rotation of an object (as shown in FIG. 10B), an L-shaped movement (FIG. 10C), a V-shaped movement (FIG. 10D). In addition, a gesture can be movements of a plurality of objects, for example, movements between several objects, as shown in FIG. 10E, two or more fingers draws closer or further from each other. The plurality of objects can be the fingers of the same hand or different hands or some other objects like a pen; the present invention is not limited to these. Similarly, a gesture can be rotations between several objects, as shown in FIG. 10F, more particularly, relative rotations between objects or rotation of one object around another. Moreover, a gesture can be movements of objects in the same direction, as shown in FIG. 10G.

Therefore, the present invention includes but not limited to the follow examples: when a command gesture is a movement in one direction, the corresponding command can be an arrow command on a simulated keyboard; when a command gesture is rotation(s) of one or more object(s) or one around another, it could correspond to a rotation of a display image in a certain angle in accordance with the direction of rotation; when a command gesture is relative movements between several objects, it could correspond to zoom-in of the display image when objects move away from each other or zoom-out when objects move closer; and when several objects move in the same direction, it could correspond to a translation or scroll of the display image. The display image can be the whole image, some portion of the image or certain graphs.

The above embodiments are only used to illustrate the principles of the present invention, and they should not be construed as to limit the present invention in any way. The above embodiments can be modified by those with ordinary skills in the arts without departing from the scope of the present invention as defined in the following appended claims.

The invention claimed is:

1. A capacitive sensing method, comprising:
   sensing signals or signal changes of a plurality of intersecting points on a touch panel through three mutual capacitances of the touch panel, wherein for each of the plurality of intersecting points the three mutual capacitances includes a first mutual capacitance between one of a plurality of first conductive lines and one of a plurality of second conductive lines, a second mutual capacitance between at least one of a plurality of electrical conductors and the one of the plurality of first conductive lines, and a third mutual capacitance between the at least one of the plurality of electrical conductors and the one of the plurality of second conductive lines, wherein a predetermined range is determined based on the electrical conductors;
   identifying the location of an object touching or getting near the touch panel based on the signals or signal changes of the intersecting points that fall within the predetermined range; and
   continuously identifying the locations of the object to determine whether it is a command gesture;
   wherein the touch panel includes the plurality of first conductive lines isolated from each other and the plurality of second conductive lines isolated from each other, wherein the first and second plurality of conductive lines are electrically isolated from and stacked on one another forming the plurality of intersecting points, wherein the plurality of electrical conductors respectively crossing the intersecting points.

2. The capacitive sensing method of claim 1, wherein the location of the object is identified from an image which is constituted based on the signals or signal changes of the intersecting points that fall within the predetermined range.

3. The capacitive sensing method of claim 1, wherein the location of the object is identified based on intersecting points fall within the predetermined range in an image, which is constituted based on the signals or signal changes of the intersecting points.

4. The capacitive sensing method of claim 1, wherein any two touched locations constitute a pair of diagonal real vertices on a virtual parallelogram, and the dimension of the electrical conductors determines signal differences between intersecting points around the real vertices and another pair of pseudo vertices on the virtual parallelogram, wherein signals or signal changes of the intersecting points around the pair of pseudo vertices fall outside the predetermined range.

5. The capacitive sensing method of claim 1, wherein the command gesture is one a plurality of preset gestures selected from the group consisting of movement of an object in one direction; single object rotation, relative movements between a plurality of objects, relative rotations between a plurality of objects, rotation of one object around another and movement of a plurality of objects in the same direction.

6. The capacitive sensing method of claim 1, wherein a command is executed based on the command gesture identified, wherein the command is one selected from the group consisting of zoom-in, zoom-out, rotate, translate, scroll, cut, paste and delete.

7. A capacitive sensing method, comprising:
   sensing signals or signal changes of a plurality of intersecting points on a touch panel through three mutual capacitances of the touch panel to form an image, wherein for each of the plurality of intersecting points the three mutual capacitances includes a first mutual capacitance between one of a plurality of first conductive lines and one of a plurality of second conductive lines, a second mutual capacitance between at least one of a plurality of electrical conductors and the one of the plurality of first conductive lines, and a third mutual capacitance between the at least one of the plurality of electrical conductors and the one of the plurality of second conductive lines, wherein a predetermined range is determined based on the electrical conductors;
   identifying the location of an object touching or getting near the touch panel based on the signals or signal changes of the intersecting points that fall within the predetermined range in the image; and continuously identifying the locations of the object to determine whether it is a command gesture;
wherein the touch panel includes the plurality of first conductive lines isolated from each other and the plurality of second conductive lines isolated from each other, wherein the first and second plurality of conductive lines are electrically isolated from and stacked on one another forming the plurality of intersecting points, wherein the plurality of electrical conductors respectively crossing the intersecting points.

8. The capacitive sensing method of claim 7, wherein any two touched locations constitute a pair of diagonal real vertices on a virtual parallelogram, and the dimension of the electrical conductors determines signal differences between intersecting points around the real vertices and another pair of pseudo vertices on the virtual parallelogram, wherein signals or signal changes of the intersecting points around the pair of pseudo vertices fall outside the predetermined range.

9. The capacitive sensing method of claim 7, wherein the command gesture is one a plurality of preset gestures selected from the group consisting of movement of an object in one direction; single object rotation, relative movements between a plurality of objects, relative rotations between a plurality of objects, rotation of one object around another and movement of a plurality of objects in the same direction.

10. The capacitive sensing method of claim 7, wherein a command is executed based on the command gesture identified, wherein the command is one selected from the group consisting of zoom-in, zoom-out, rotate, translate, scroll, cut, paste and delete.

11. A capacitive sensing device, comprising:
a touch panel including a plurality of first conductive lines isolated from each other, a plurality of second conductive lines isolated from each other and a plurality of electrical conductors respectively crossing a plurality of intersecting points where the first and second plurality of conductive lines are electrically isolated from and stacked on one another, wherein a predetermined range is determined based on the electrical conductors;
a sensing unit for sensing signals or signal changes of the intersecting points through three mutual capacitances of the intersecting points, and identifying the location of an object touching or getting near the touch panel based on the signals or signal changes of the intersecting points that fall within the predetermined range, wherein for each of the plurality of intersecting points the three mutual capacitances includes a first mutual capacitance between one of a plurality of first conductive lines and one of a plurality of second conductive lines, a second mutual capacitance between at least one of a plurality of electrical conductors and the one of the plurality of first conductive lines, and a third mutual capacitance between the at least one of the plurality of electrical conductors and the one of the plurality of second conductive lines; and
an identifying unit for continuously identifying the locations of the object to determine whether it is a command gesture.

12. The capacitive sensing device of claim 11, wherein the sensing unit forms an image based on the signals or signal changes of the intersecting points that fall within the predetermined range, wherein the location of the object is identified based on the image.

13. The capacitive sensing device of claim 11, wherein the sensing unit forms an image based on the signals or signal changes of the intersecting points, wherein the location of the object is identified based on the intersecting points that fall within the predetermined range in the image.

14. The capacitive sensing device of claim 11, wherein the identifying unit generates object trajectory continuously based on the locations of the object, and compares the object trajectory with a plurality of preset gestures to determine whether it is a command gesture.

15. The capacitive sensing device of claim 11, wherein any two touched locations constitute a pair of diagonal real vertices on a virtual parallelogram, and the dimension of the electrical conductors determines signal differences between intersecting points around the real vertices and another pair of pseudo vertices on the virtual parallelogram, wherein signals or signal changes of the intersecting points around the pair of pseudo vertices fall outside the predetermined range.

16. The capacitive sensing device of claim 11, wherein the command gesture is one a plurality of preset gestures selected from the group consisting of movement of an object in one direction; single object rotation, relative movements between a plurality of objects, relative rotations between a plurality of objects, rotation of one object around another and movement of a plurality of objects in the same direction.

17. The capacitive sensing device of claim 11, wherein a command is executed based on the command gesture identified, wherein the command is one selected from the group consisting of zoom-in, zoom-out, rotate, translate, scroll, cut, paste and delete.

18. A capacitive sensing device, comprising:
a touch panel including a plurality of first conductive lines isolated from each other, a plurality of second conductive lines isolated from each other and a plurality of electrical conductors respectively crossing a plurality of intersecting points where the first and second plurality of conductive lines are electrically isolated from and stacked on one another, wherein a predetermined range is determined based on the electrical conductors;
a sensing unit for sensing signals or signal changes of the intersecting points through three mutual capacitances of the intersecting points, and forming an image based on the signals or signal changes of intersecting points that fall within the predetermined range, wherein for each of the plurality of intersecting points the three mutual capacitances includes a first mutual capacitance between one of a plurality of first conductive lines and one of a plurality of second conductive lines, a second mutual capacitance between at least one of a plurality of electrical conductors and the one of the plurality of first conductive lines, and a third mutual capacitance between the at least one of the plurality of electrical conductors and the one of the plurality of second conductive lines; and
an identifying unit for identifying the trajectory of the object touching or getting near the touch panel based on a plurality of images, and determining whether the object trajectory is a command gesture.

19. The capacitive sensing device of claim 18, wherein any two touched locations constitute a pair of diagonal real vertices on a virtual parallelogram, and the dimension of the electrical conductors determines signal differences between intersecting points around the real vertices and another pair of pseudo vertices on the virtual parallelogram, wherein signals or signal changes of the intersecting points around the pair of pseudo vertices fall outside the predetermined range.

20. The capacitive sensing device of claim 18, wherein the command gesture is one a plurality of preset gestures selected from the group consisting of movement of an object in one direction; single object rotation, relative movements between a plurality of objects, relative rotations between a plurality of objects, rotation of one object around another and movement of a plurality of objects in the same direction.

21. The capacitive sensing device of claim 18, wherein a command is executed based on the command gesture identified, wherein the command is one selected from the group consisting of zoom-in, zoom-out, rotate, translate, scroll, cut, paste and delete.

22. A capacitive sensing device, comprising:
- a touch panel including a plurality of first conductive lines isolated from each other, a plurality of second conductive lines isolated from each other and a plurality of electrical conductors respectively crossing a plurality of intersecting points where the first and second plurality of conductive lines are electrically isolated from and stacked on one another, wherein a predetermined range is determined based on the electrical conductors;
- a sensing unit for sensing an image formed from signals or signal changes of the intersecting points through three mutual capacitances of the intersecting points, wherein for each of the plurality of intersecting points the three mutual capacitances includes a first mutual capacitance between one of a plurality of first conductive lines and one of a plurality of second conductive lines, a second mutual capacitance between at least one of a plurality of electrical conductors and the one of the plurality of first conductive lines, and a third mutual capacitance between the at least one of the plurality of electrical conductors and the one of the plurality of second conductive lines; and
- an identifying unit for identifying the trajectory of the object touching or getting near the touch panel based on intersecting points that fall within the predetermined range in a plurality of images, and determining whether the object trajectory is a command gesture.

23. The capacitive sensing device of claim 22, wherein any two touched locations constitute a pair of diagonal real vertices on a virtual parallelogram, and the dimension of the electrical conductors determines signal differences between intersecting points around the real vertices and another pair of pseudo vertices on the virtual parallelogram, wherein signals or signal changes of the intersecting points around the pair of pseudo vertices fall outside the predetermined range.

24. The capacitive sensing device of claim 22, wherein the command gesture is one a plurality of preset gestures selected from the group consisting of movement of an object in one direction; single object rotation, relative movements between a plurality of objects, relative rotations between a plurality of objects, rotation of one object around another and movement of a plurality of objects in the same direction.

25. The capacitive sensing device of claim 22, wherein a command is executed based on the command gesture identified, wherein the command is one selected from the group consisting of zoom-in, zoom-out, rotate, translate, scroll, cut, paste and delete.

* * * * *